United States Patent
Kliesner et al.

(10) Patent No.: US 7,212,598 B2
(45) Date of Patent: May 1, 2007

(54) DATA BUFFER-CONTROLLED DIGITAL CLOCK REGENERATOR

(75) Inventors: Matthew A. Kliesner, Madison, AL (US); Timothy G. Mester, Madison, AL (US); Eric M. Rives, Hampton Cove, AL (US)

(73) Assignee: Adtran, Inc., Huntsville, AL (US)

( * ) Notice: Subject to any disclaimer, the term of this patent is extended or adjusted under 35 U.S.C. 154(b) by 775 days.

(21) Appl. No.: 10/620,145

(22) Filed: Jul. 15, 2003

(65) Prior Publication Data

US 2005/0013395 A1    Jan. 20, 2005

(51) Int. Cl.
*H04L 7/00* (2006.01)
(52) U.S. Cl. .................. 375/371; 370/517; 327/152
(58) Field of Classification Search ............... 375/371, 375/373, 354–355, 376; 370/516, 517, 519; 713/400, 401, 500, 503; 327/141, 144, 152, 327/161
See application file for complete search history.

(56) References Cited

U.S. PATENT DOCUMENTS

| | | | | |
|---|---|---|---|---|
| 5,220,581 A * | 6/1993 | Ferraiolo et al. | ............ | 375/226 |
| 5,245,637 A * | 9/1993 | Gersbach et al. | ............ | 375/374 |
| 5,796,796 A * | 8/1998 | Wang | ......................... | 375/372 |
| 6,092,128 A * | 7/2000 | Maas et al. | .................... | 710/57 |
| 6,810,098 B1 * | 10/2004 | Paul et al. | .................. | 375/372 |
| 6,917,660 B2 * | 7/2005 | Song | .......................... | 375/373 |
| 7,100,066 B2 * | 8/2006 | Jeong | ......................... | 713/500 |

OTHER PUBLICATIONS

Lärs Erup, Floyd M. Gardner, And Robert A. Harris. Interpolation in digital modems—Part II: Implementation and performance. IEEE Transactions on Communication, 41 (6) :998-1008, Jun. 1993.

Timo I. Laasko, Vesa Valimaki, Matti Karjalainen, and Unto K. Laine. Splitting the unit delay. IEEE Signal Processing Magazine, pp. 30-60, Jan. 1996.

Heinrich Meyer, Marc Moeneclaey, and Stefan A. Fechtel. Digital Communication Receivers: synchronization, channel estimation and signal processing. John Wiley & Sons, 1998.

* cited by examiner

*Primary Examiner*—Khanh Tran
(74) *Attorney, Agent, or Firm*—Allen, Dyer, Doppelt, Milbrath & Gilchrist, P.A.

(57) ABSTRACT

A clock regeneration scheme for a digital communication receiver has a first-in, first-out (FIFO) storage buffer into which received data is clocked in accordance with an input clock signal and a data valid signal. A fixed fractional delay line is coupled to provide respectively different phase delayed versions of the input clock signal and feeds a multiplexer that is controllably operative to couple one of the outputs of the fixed fractional delay line to a regenerated clock output port. A control loop, which includes the FIFO storage buffer, the output port and a steering control input of the multiplexer circuit, is operative to selectively change which output of the fixed fractional delay line is coupled by the multiplexer to the output port, so as to controllably cause the output clock signal to track the effective frequency of the valid data signal.

14 Claims, 1 Drawing Sheet

DATA BUFFER-CONTROLLED DIGITAL CLOCK REGENERATOR

FIELD OF THE INVENTION

The present invention relates in general to communication systems and subsystems therefor, and is particularly directed to a clock regeneration scheme for a digital communication receiver. The clock regeneration scheme employs a fixed fractional delay line that is driven by a received data clock, to provide a plurality of respectively offset phase delayed versions of the received clock. One of the phase delayed versions of the received clock is used as the regenerated clock. A data buffer-based control loop is controllably stepped through outputs of the fixed fractional delay line, to controllably cause effective frequency of the regenerated clock to track the effective frequency of a valid data signal.

BACKGROUND OF THE INVENTION

In order to successfully coherently recover data from a received digital communication signal, digital communication receivers employ some form of clock recovery mechanism that operates on the received signal to regenerate the embedded clock signal. As diagrammatically illustrated in FIG. 1, the clock and data transport path often include a first-in, first-out (FIFO) buffer 10, which receives a serial data stream 11 that is synchronous with an incoming clock signal 12. Because the data is not necessarily continuous (namely, a new piece of data is not always available at each clock cycle of the recovered clock), a valid data signal 13 indicating when the data is valid, is provided to the buffer.

The output end 14 of the buffer is coupled to a downstream digital device 15, which requires the generation of an output or read clock 16 that matches the effective data rate, but without gaps such as may be associated with times of the input clock for which there is no valid data. This allows data to be read out from the buffer at each clock cycle of the newly generated clock. This new clock and the data can then be successfully delivered to the next portion of the downstream digital transport path. Conventional approaches to solving this problem involve dividing a high-speed clock down to the necessary frequency, or the use of an external phase locked loop.

SUMMARY OF THE INVENTION

The present invention obviates the need for a high speed clock or an external mechanism, by means of a clock regeneration scheme that employs a fixed fractional delay line coupled to receive the received clock signal that accompanies the data. The fixed fractional delay line has a plurality of output ports from which respective incrementally delayed versions of the received clock are produced. Namely, the delay line produces N clock signals having successive delays (0/N)360, (1/N)360, . . . , ((N−1)/N)360 degrees relative to its input clock.

These N clock signals are respectively coupled to N input ports of a multiplexer, from the output of which the regenerated clock signal is derived. The multiplexer output is further coupled to the readout clock port of the FIFO data buffer into and through which the data signal is clocked, in accordance with the received or input clock, and on the basis of a data valid signal that accompanies the data. The multiplexer is controlled by respective overflow/full and underflow/empty signals from the data buffer.

When the regenerated clock is running faster than the data valid signal, the underflow state of the buffer will cause the multiplexer to incrementally advance or step in a first, increased delay direction through the plurality of output ports of the delay line. This has the effect of lengthening a portion of one of the half-cycles of the received or input clock signal, thereby slowing down the regenerated clock. On the other hand, when the regenerated clock is running slower than the data valid signal, the overflow state of the buffer will cause the multiplexer to incrementally step through the output ports of the delay line in a reverse direction. This has the effect of shortening a portion of one of the half-cycles of the received clock signal, thereby speeding up the regenerated clock.

DETAILED DESCRIPTION

Figure 1:
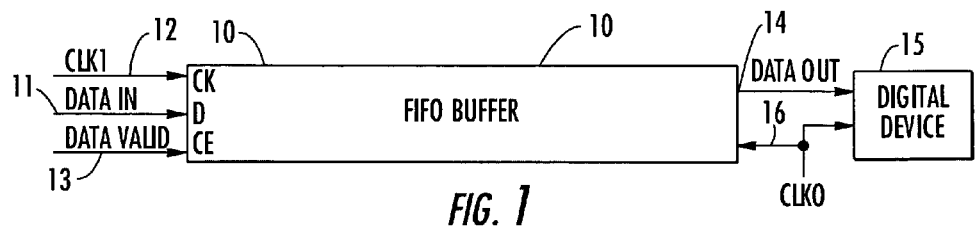
FIG. 1 diagrammatically illustrates a conventional data buffer transport path for a digital communication receiver.

Before describing the fixed fractional delay line-based clock regeneration circuit in accordance with the present invention, it should be observed that the invention resides primarily in a modular arrangement of conventional digital communication circuits and components. In a practical implementation that facilitates their being packaged in a hardware-efficient equipment configuration, these modular arrangements may be readily implemented as field programmable gate array (FPGA), or application specific integrated circuit (ASIC) chip sets.

Consequently, the configuration of such arrangements of circuits and components and the manner in which they are interfaced with other telecommunication equipment have, for the most part, been illustrated in the drawings by a readily understandable block diagrams, and associated timing diagrams, which show only those specific details that are pertinent to the present invention, so as not to obscure the disclosure with details which will be readily apparent to those skilled in the art having the benefit of the description herein. The block diagram illustrations are primarily intended to show the major components of the clock recovery circuit of the invention in a convenient functional grouping, whereby the present invention may be more readily understood.

Figure 2:
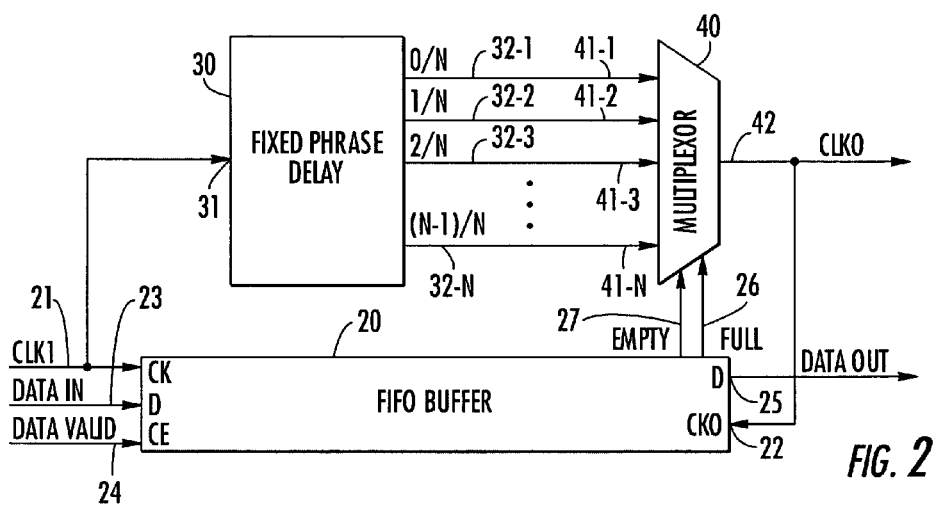
FIG. 2 diagrammatically illustrates an embodiment of the fixed fractional delay line-based clock regeneration circuit of the present invention.

Attention is now directed to FIG. 2, wherein an embodiment of the fixed fractional delay line-based clock regeneration circuit of the present invention is diagrammatically shown as comprising a clock input port 21, to which a received or input clock signal CLKI at some frequency $f_N$ is applied. Clock input port 21 is coupled to the clock input port of a FIFO data buffer 20 and to an input 31 of a fixed phase delay line 30, which has a plurality of output ports 32-1, 32-2, 32-3, . . . , 32-N, from which respective incrementally delayed versions of the fixed clock frequency $f_N$ are produced. Namely, delay line 30 is operative to produce N clock signals having successive delays (0/N)360, (1/N)360, . . . , ((N−1)/N)360 degrees relative to the input clock supplied to the clock input port 21.

These N clock signals are respectively coupled to N input ports 41-1, 41-2, 41-3, . . . , 41-N of a multiplexer 40, an output port 42 of which produces the regenerated or output clock signal CLKO. The output port 42 is further coupled to a read out clock port 22 of the FIFO data buffer 20. Data buffer 20 further includes a data input port 23 to which the received data stream is coupled, as well as a Data Valid (or Chip Enable) port 24, the binary state of which indicates whether there is valid data at the data input port 23. The Data Valid bit will typically be valid at a rate that is less than the frequency of the input clock (e.g., on the order of 40–45 MHz for the data valid bit vs. an input clock rate of 50 MHz). The data buffer 20 further includes a data output port 25 from which the output data stream is derived in accordance with the read out clock. Data buffer 20 further includes a pair of capacity status bits associated with the data storage availability of the buffer. A full bit port 26 is used to indicate a buffer overflow condition (i.e., that the buffer is full), while an empty bit port 27 is used to indicate a buffer underflow condition (i.e., that the buffer is empty). Namely, the capacity status bits indicate whether the regenerated clock CLKO is running faster or slower than the effective clock rate of the Data Valid bit.

As pointed out above, where the output clock CLKO is running faster than the effective rate of the data valid signal, the state of the empty bit will cause the multiplexer 30 to incrementally advance or step through the plurality of output ports 32-1, 32-2, . . . , 32-N of the delay line 20. As will be described below with reference to the timing diagram of FIG. 3, this has the effect of lengthening one of the half-cycles of the regenerated clock signal CLKO, thereby slowing down the regenerated clock. On the other hand, where the output clock CLKO is running slower than the effective rate of the data valid signal, the state of the full bit will cause the multiplexer 30 to incrementally reverse through the plurality of output ports 32-1, 32-2, . . . , 32-N of the delay line 20. As will be described below with reference to the timing diagram of FIG. 4, this has the effect of shortening one of the half-cycles of the regenerated clock signal, thereby speeding up the regenerated clock.

Figure 3:
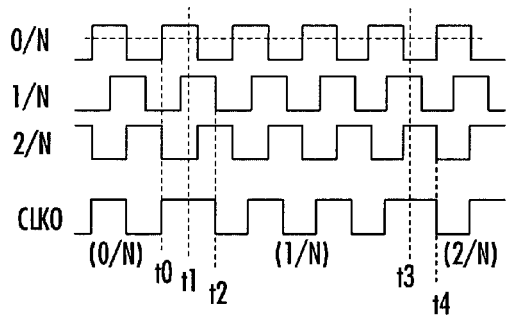
FIG. 3 is a timing diagram showing the effect of lengthening a portion of a clock cycle of the received clock signal of the circuit of FIG. 2, so as to slow down the regenerated clock.

More particularly, FIG. 3 shows a non-limiting example of a set of three phase delayed versions of the input clock signal CLKI as produced at output ports 32-1, 32-2, . . . , 32-N of the fraction delay line 30, where N=4. Since N=4, each successive version of the received or input clock signal CLKI is delayed by 90° relative to its immediately preceding version of the input clock signal. It will be assumed that the multiplexer is initially reset to couple its first input port 41-1 to its output port 42, and that the output clock CLKO is running faster than the effective rate of the data valid signal. This tends to drive the buffer to an underflow or empty condition. It will also be assumed that the clock signal adjustment occurs once for every three successive clock cycles. Since multiplexer 40 'points' to its input port 41-1, then at time t0, the rising edge of the output clock CLKO coincides with the rising edge of the input clock version having the phase delay (0/N)360.

At time t1, the empty bit port 27 of the data buffer produces an output associated with an underflow condition. For this state of the full bit port, multiplexer 40 responds by incrementing the connection of the output port 42 to the second input port 42-2. Since, at time t1, the high state of the input clock version having the phase delay (1/N)360 is the same as that (high) as the input clock version having the phase delay (0/N)360, the state of the output clock is high and remains high for an additional period of time, to coincide with the clock version having phase delay (1/N) 360, which transitions low at time t2. Namely, due to the incrementing of the fixed phase delayed versions of the fixed input clock, the output clock has been lengthened or has slipped by a fraction (here 90°) of the clock cycle of the input clock.

With the clock signal adjustment occurring once for every three successive clock cycles, then at time t3 in the timing diagram of FIG. 3, there is a further incremental advancing or stepping from the input clock version having the phase delay (1/N)360 to the next input clock version, namely, the input clock version having the phase delay (2/N)360. As shown therein, at time t3, the high state of the input clock version having the phase delay (2/N)360 is again the same as that (high) as the input clock version having the phase delay (1/N)360, so that the state of the output clock is high and remains high for an additional period of time, to coincide with the clock version having phase delay (2/N) 360, which transitions low at time t4. Thus, due to the further incrementing of the fixed phase delayed versions of the input clock, the output clock CLKO is again lengthened or slipped by a 90° fraction of the clock cycle of the input clock. It will be appreciated that for the example shown in the timing diagram of FIG. 3, such slipping or lengthening of the output clock effectively reduces the frequency of the output clock CLKO to 12/13 of the frequency of the input clock.

Figure 4:
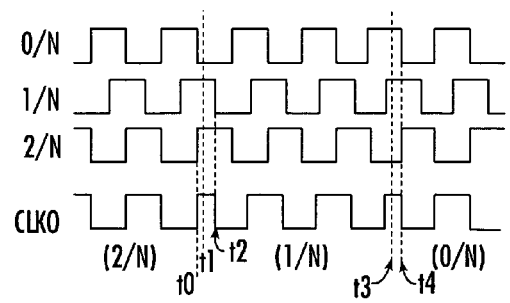
FIG. 4 is a timing diagram showing the effect of shortening a portion of a clock cycle of the received clock signal of the circuit of FIG. 2, so as to speed up the regenerated clock.

The timing diagram of FIG. 4 shows the same set of three phase delayed versions of the input clock signal CLKI as produced at output ports 32-1, 32-2, . . . , 32-N of the fraction delay line 30, again with N=4. It will be assumed that the multiplexer 40 is initially pointing to input port 41-3, so that at time t0, the rising edge of the output clock CLKO coincides with the rising edge of the input clock version having the phase delay (2/N)360.

At time t1, the overflow or full bit port 26 produces an output associated with an overflow condition. For this state of the overflow bit port, multiplexer 40 responds by decrementing the connection of the output port 42 to the second input port 42-2. Since, at time t1, the high state of the input clock version having the phase delay (1/N)360 is the same as that (high) as the input clock version having the phase delay (2/N)360, the state of the output clock is initially high, but then transitions low at time t2, to coincide with falling edge of the clock version having phase delay (1/N)360, which transitions low at time t2. Namely, due to the decrementing of the fixed phase delayed versions of the input clock, the output clock has been shortened or advanced by a fraction (here 90°) of the clock cycle of the input clock.

With the clock signal adjustment occurring once for every three successive clock cycles, then at time t3 in the timing diagram of FIG. 4, there is a further decrementing from the input clock version having the phase delay (1/N)360 to the input clock version having the phase delay (0/N)360. Namely, due to the further decrementing of the fixed phase delayed versions of the input clock CLKI, the output clock CLKO has been shortened or advanced by a fraction (here 90°) of the clock cycle of the input clock. For the example shown in the timing diagram of FIG. 4, advancing the output clock effectively increases the frequency of the output clock CLKO to 12/11 of that of the input clock.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of regenerating an output clock signal for controlling the coupling of received data to an output port therefor comprising the steps of:
   (a) clocking said received data into a first in, first-out (FIFO) storage buffer in accordance with an input clock signal associated with said received data signal and a data valid signal representative of valid received data;
   (b) coupling said input clock signal to a multitap delay line, having outputs that provide respectively different phase delayed versions of said input clock signal;
   (c) coupling one of said outputs of said multitap delay line to said output port from which said output clock signal is derived, said output clock signal being coupled to said FIFO storage buffer to clock out data therefrom;
   (d) controllably coupling to said output port an output of said multitap delay line that provides a later-in-time delay relative to said one of said outputs of said multitap delay line, in response to said output clock signal exhibiting a clock frequency that is higher than the effective frequency of said valid data signal, thereby reducing the frequency of said output clock signal, or
   controllably coupling to said output port an output of said multitap delay line that provides an earlier-in-time delay relative to said one of said outputs of said multitap delay line, in response to said output clock signal exhibiting a clock frequency that is lower than the frequency of said valid data signal, thereby increasing the frequency of said output clock signal.

2. The method according to claim 1, wherein said relationship between said valid data signal and said output clock signal is represented by the amount of data contained in said FIFO storage buffer and the data storage capacity of said FIFO storage buffer.

3. The method according to claim 2, wherein said relationship between said valid data signal and said output clock signal is represented by an underflow or overflow condition of said FIFO storage buffer.

4. The method according to claim 3, wherein step (d) comprises controllably coupling to said output port an output of said multitap delay line that provides a later-in-time delay relative to said one of said outputs of said multitap delay line, in response to said output clock signal causing an underflow condition of said FIFO storage buffer, thereby reducing the frequency of said output clock signal.

5. The method according to claim 3, wherein step (d) comprises controllably coupling to said output port an output of said multitap delay line that provides an earlier-in-time delay relative to said one of said outputs of said multitap delay line, in response to said output clock signal causing an overflow condition of said FIFO storage buffer, thereby increasing the frequency of said output clock signal.

6. An apparatus for regenerating an output clock signal for controlling the coupling of received data to an output port therefor comprising:
   a first-in, first-out (FIFO) storage buffer into which said received data is clocked in accordance with an input clock signal associated with said received data signal and a data valid signal representative of valid received data;
   a multitap delay line to which said input clock signal is coupled, said multitap delay line having outputs that provide respectively different phase delayed versions of said input clock signal; and
   a multiplexer, which is operative to controllably couple to said output port an output of said multitap delay line that provides a later-in-time delay relative to a selected one of said outputs of said multitap delay line, in response to said output clock signal exhibiting a clock frequency that is higher than the effective frequency of said valid data signal, thereby reducing the frequency of said output clock signal, and
   which is operative to controllably couple to said output port an output of said multitap delay line that provides an earlier-in-time delay relative to said selected one of said outputs of said multitap delay line, in response to said output clock signal exhibiting a clock frequency that is lower than the frequency of said valid data signal, thereby increasing the frequency of said output clock signal.

7. The apparatus according to claim 6, wherein said relationship between said valid data signal and said output clock signal is represented by the amount of data contained in said FIFO storage buffer and the data storage capacity of said FIFO storage buffer.

8. The apparatus according to claim 7, wherein said relationship between said valid data signal and said output clock signal is represented by an underflow or overflow condition of said FIFO storage buffer.

9. The apparatus according to claim 8, wherein said multiplexer is operative to controllably couple to said output port an output of said multitap delay line that provides a later-in-time delay relative to said one of said outputs of said multitap delay line, in response to said output clock signal causing an underflow condition of said FIFO storage buffer, thereby reducing the frequency of said output clock signal.

10. The apparatus according to claim 8, wherein said multiplexer is operative to controllably couple to said output port an output of said multitap delay line that provides an earlier-in-time delay relative to said one of said outputs of said multitap delay line, in response to said output clock signal causing an overflow condition of said FIFO storage buffer, thereby increasing the frequency of said output clock signal.

11. An apparatus for regenerating an output clock signal for controlling the coupling of received data to an output port therefor comprising:
   a first-in, first-out (FIFO) storage buffer into which said received data is clocked in accordance with an input clock signal associated with said received data signal and a data valid signal representative of valid received data;
   a fixed fractional delay line having an input port coupled to receive said input clock signal, said fixed fractional delay line having a plurality of outputs that provide respectively different phase delayed versions of said fixed frequency input clock signal;
   a multiplexer having a plurality of inputs respectively coupled to said plurality of outputs of said fixed fractional delay line, and being controllably operative to couple one of said outputs of said fixed fractional delay line to said output port; and
   a control loop coupled with said FIFO storage buffer, said output port and a steering control input of said multiplexer circuit, and being, operative to selectively change which of said outputs of said fixed fractional delay line is coupled by said multiplexer to said output port, so as to controllably change said output clock signal in accordance with a relationship between valid data signal and said output clock signal, and thereby cause the output clock signal to track the effective frequency of the valid data signal; and wherein said multiplexer is operative to controllably couple to said output port an output of said fixed fractional delay line that provides a later-in-time delay relative to a selected one of said outputs of said fixed fractional delay line, in response to said output clock signal exhibiting a clock frequency that is higher than the effective frequency of said valid data signal, thereby reducing the frequency of said output clock signal, and wherein said multiplexer is operative to controllably couple to said output port an output of said fixed fractional delay that provides an earlier-in-time delay relative to said selected one of said outputs of said fixed fractional delay line, in response to said output clock signal exhibiting a clock frequency that is lower than the frequency of said valid data signal, thereby increasing the frequency of said output clock signal.

12. The apparatus according to claim 11, wherein said relationship between said valid data signal and said output clock signal is represented by the amount of data contained in said FIFO storage buffer and the data storage capacity of said FIFO storage buffer.

13. The apparatus according to claim 12, wherein said multiplexer is operative to controllably couple to said output port an output of said fixed fractional delay line that provides a later-in-time delay relative to said one of said outputs of said fixed fractional delay line, in response to said output clock signal causing an underflow condition of said FIFO storage buffer, thereby reducing the frequency of said output clock signal.

14. The apparatus according to claim 12, wherein said multiplexer is operative to controllably couple to said output port an output of said fixed fractional delay line that provides an earlier-in-time delay relative to said one of said outputs of said fixed fractional delay line, in response to said output clock signal causing an overflow condition of said FIFO storage buffer, thereby increasing the frequency of said output clock signal.

* * * * *